April 16, 1929.  E. A. RICHMOND ET AL  1,709,283
ELECTRIC SAFETY DEVICE
Filed Aug. 27, 1924  2 Sheets-Sheet 1
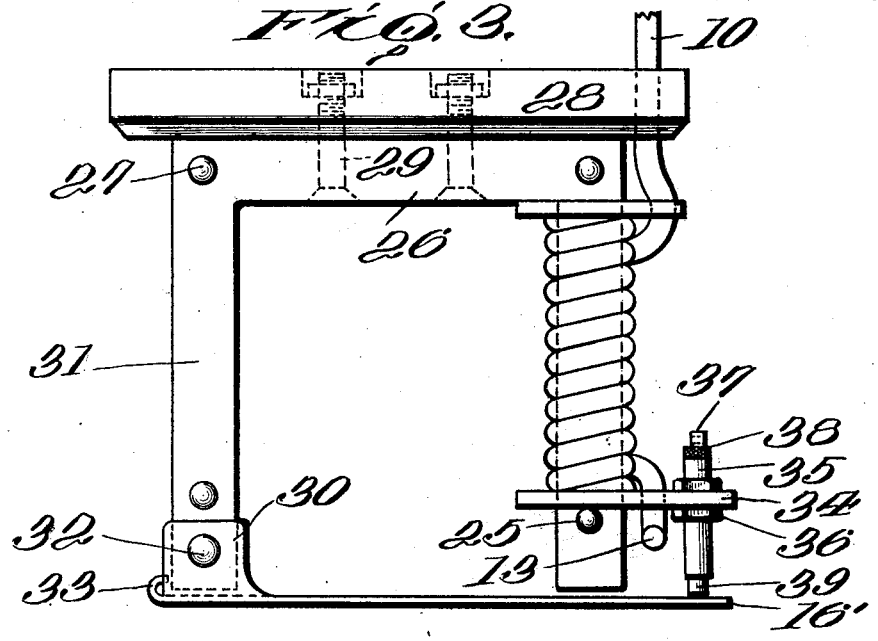
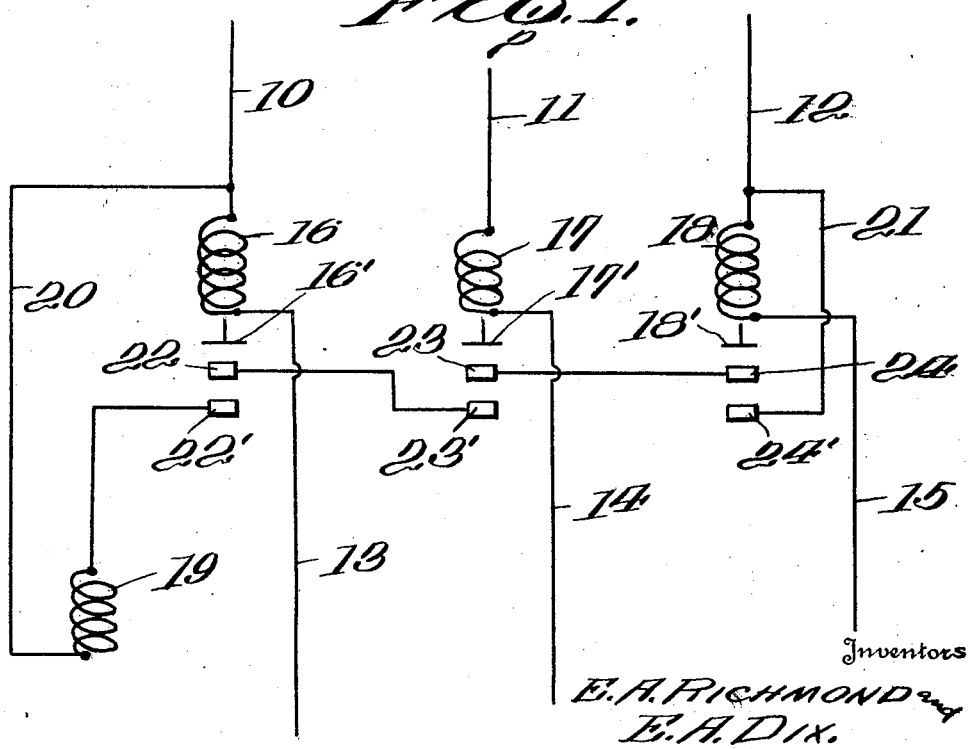
Inventors
E. A. RICHMOND and
E. A. DIX.
By Stevens and Batchelor
Attorneys.

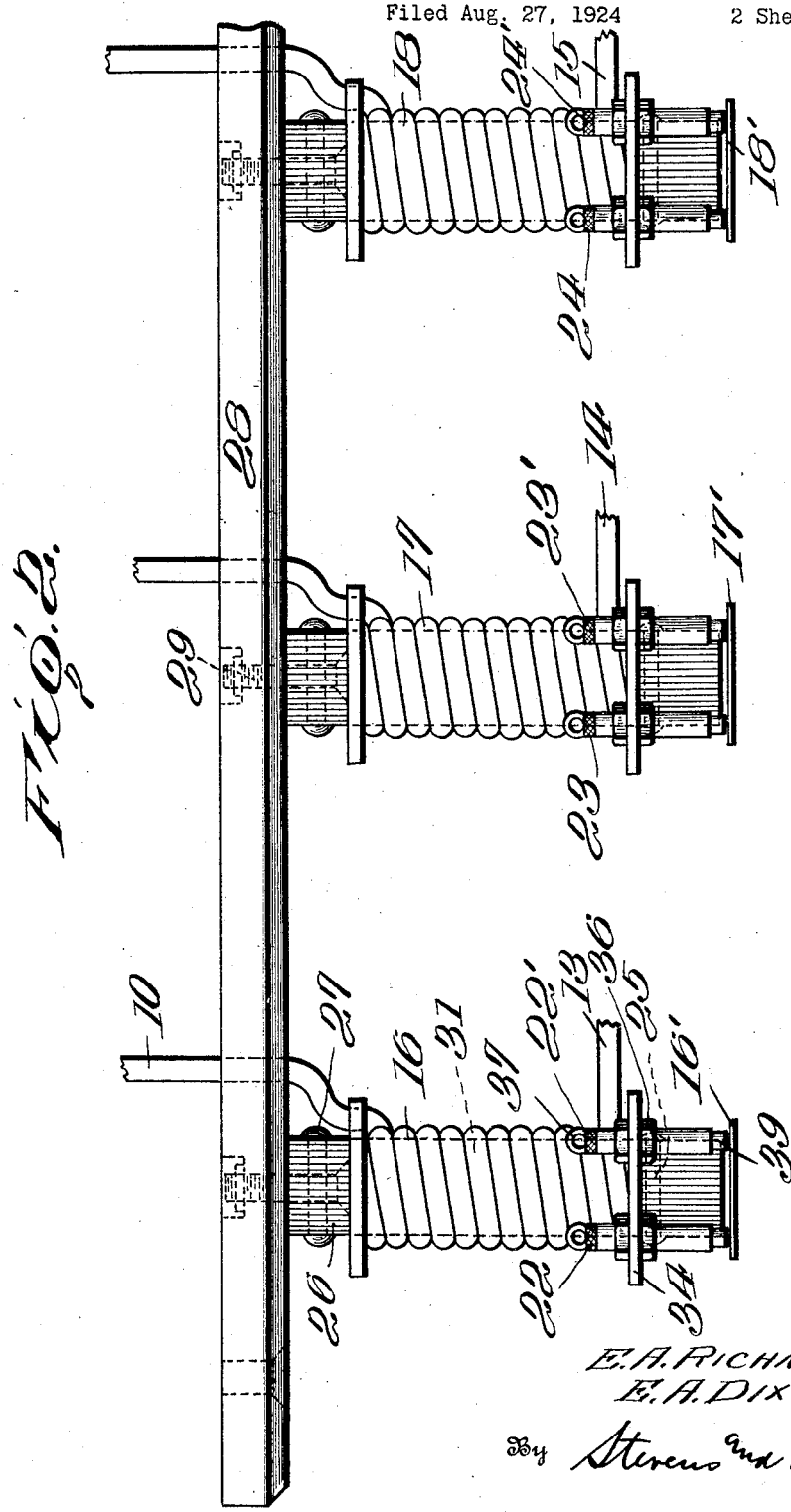

Patented Apr. 16, 1929.

1,709,283

UNITED STATES PATENT OFFICE.

ETHAN A. RICHMOND AND EARL A. DIX, OF QUINCY, ILLINOIS.

ELECTRIC SAFETY DEVICE.

Application filed August 27, 1924. Serial No. 734,488.

This invention relates to electric safety devices and more particularly to devices for protecting polyphase alternating current motors upon failure of current in one or more of the phases.

It is the general object of this invention to provide a novel and improved device of the nature described.

More particularly it is an object of this invention to provide, in an electric safety device, a means for opening all of the circuits to a polyphase motor upon failure of the current in any one or more circuits, due to any cause, such as the blowing of a fuse, or the burning out of a transformer coil.

Another object of this invention consists in the provision of a relay device having a plurality of current coils, one interposed in the circuit of each feed wire, and energizing magnets, the armatures of which serve to close a plurality of series of contacts arranged in the circuit of a holding coil for maintaining the starting switch of the motor in a circuit closing position.

A still further object of this invention consists in the provision of a relay magnet, having exciting windings adapted to be interposed in the circuit of a motor, and being wound upon a magnet core or yoke whose magnetic circuit is closed by a pivoted armature normally held open by gravity but closing upon the passage of sufficient current through the exciting winding to operate the motor at no load, the armature serving to bridge a pair of contacts interposed in the operating circuit of a holding or no voltage release coil.

In the operation of polyphase alternating current motors there is always the possibility of current failure in one or more of the lines feeding current to the motor such as by the blowing of a fuse, the burning out of a transformer coil or lead wire, etc. which allows the motor to operate on less than its total number of phases. Such operation results in an excessive flow of current through the remaining operating phases which may result in excessive heating and the consequent charing or burning of the insulation if not the complete burning out of these windings. To overcome this difficulty it has hitherto been proposed to provide some form of relay device operating to open all of the circuits upon failure of the current in one or more of the feed lines or upon excess flow of current in one or more of those lines remaining intact. Difficulties have been experienced in these devices in providing a relay which will operate to maintain the holding coil circuit closed when the motor operates at no load, with the resultant opening of all of the circuits and the stoppage of the motor even when all of the lines are operating normally.

In order to overcome these defects the device of the present invention proposes to use an improved form of relay and magnet, having an armature completing the magnet circuit and normally opening under the action of gravity when the current coil is not excited. For an understanding of this invention reference should be had to the attached specification taken together with the accompanying drawings which disclose one embodiment of the invention, it being understood that various modifications may be made therein such as fall within the scope of the attached claim.

In the said drawings:

Figure 1 is a diagrammatic view of the circuits used in this invention.

Figure 2 is an end elevation of a set of relays adapted for use with a three phase motor, and Figure 3 is a side elevation of one of the relay magnets.

Referring to Figure 1 the wires 10, 11 and 12 represent the main feed wires of a three phase alternating current system, it being understood that current is supplied to them from any suitable source through the main switch or starting compensator (not shown) which is normally spring pressed to an open circuit position but is adapted to be held closed by means of a magnetic holding coil so that upon the occurrence of a failure of voltage in the lines this switch will automatically open. The lines 13, 14 and 15 lead directly to a three phase motor. Interposed in each of the lines 10, 13; 11, 14; 12, 15 are the three series current coils 16, 17 and 18 wound upon magnets which will be later described and, serving to retain against the action of gravity, the armature 16′, 17′ and 18′. The holding or no voltage coil of the starting switch or compensator is illustrated at 19 and obtains its exciting current from the wires 20 and 21 connected respectively to the main lines 10 and 12. The wire 21 is open in three places and at each break are arranged two contacts such as 22, 22′; 23, 23′; 24, 24′; each pair of which is adapted to be bridged by one of the armatures 16, 17′ and 18′ when current flows in the current coils 16, 17 and 18 and lifts these armatures into this bridging position. Under these conditions a complete circuit is formed through the wires 20 and 21 and the coil 19 in order to excite it so that it will maintain the main switch closed upon its being manually placed in closing position. Upon failure of the current in any one of the lines 10, 11 or 12 for any cause, it will be clear that current will cease to flow in its particular current coil allowing the armature to fall by gravity and upon the circuit at one of the sets of contacts in the wire 21 thus breaking the circuits to the coil 19 and allowing the main switch to be opened under the action of its operating spring thus preventing the motor from running, in the particular instance shown, on a single phase, since the opening of one wire in a three phase wire system leaves but one phase intact.

Reference to Figures 2 and 3 will illustrate the manner in which the armatures are mounted so as to be operated by their respective current coils. Since each of the three relays shown is identical in every respect to the other two, a description of one will suffice for all three.

The current coil 16 is wound with wire sufficiently heavy to carry all of the current needed by one phase of the motor and is placed upon the vertical leg 25 of the inverted U-shaped magnet 26 which is preferably laminated as shown. The laminations are held together by suitable rivets such as 27 and the whole is mounted on the underside of a horizontal, insulating baseboard 28 by means of suitable fastenings such as 29.

The lower ends of the legs of the U are cut off square in the same horizontal plane and the magnetic circuit is adapted to be closed by means of the armature 16' which comprises a flat strip of magnetic material having a width slightly greater than the thickness of the magnet core, and having formed integral therewith the ears 30, which are bent up at right angles to the plane of the armature to engage the sides of the leg 31 of the magnet. A pivot 32 passes through both of these ears and through the core of the magnet so as to support the armature for rotation about the lower end of the leg 31 with the opposite end of the armature in a position below the leg 25 and extending considerably beyond it. In order to prevent the armature falling by gravity to a position without the range of the magnetic attraction of the leg 25, a stop is provided by bending the end 33 of the armature which extends beyond the ears back upon itself so that its end will engage against the side of the leg 31 to stop such movement.

A sheet of insulating material 34, such as fibre or the like, surrounds and is rigidly secured to the leg 25 so that it extends outwardly therefrom and parallel to the armature, as best shown in Figure 3. A pair of holes are drilled through this insulating strip near its outer end and metallic tubes 35 passed therethrough. These tubes are held in adjusted position by means of the nuts 36 screwed upon their threaded exterior. The upper ends of these tubes are provided with the threaded rods 37 upon which can be screwed the knurled nuts 38 for the purpose of connecting wires such as 21 thereto. Into the lower ends of the tubes are forced suitable contact members such as 39 which may conveniently be tight rolls of wire gauze or any other suitable material. The bottoms of these contact members 39 are cut off square slightly below the plane of the lower ends of the magnet legs so that when current flows through the coil 16 the armature will be attracted by the leg 25 to attempt to close the magnetic circuit and in so doing the armature will be tightly held against the two contact members 39 and thus constitute an electric circuit between them as previously explained in connection with Figure 1.

From the above description it will be evident that a very slight current flow in the current coil will serve to attract the armature owing to the use of the closed-circuit type of magnet and that upon deenergization of this coil the armature will drop by the action of gravity alone and thus open the circuit between the two contact members 39 to thus deenergize the coil 19 and open the switch controlling all of the circuits to the motor.

From the above description it will be clear that this invention provides a novel and improved form of protecting relay for polyphase alternating current motors which, however, is subject to various changes and modifications such as fairly fall within the scope of the attached claim. While a three phase relay has been illustrated it will be understood that the invention can be applied to a circuit having any number of phases by the simple procedure of providing a magnet and armature for each feed wire.

Having thus described the invention, what is claimed as new and desired to be secured by Letters Patent is:

A relay for protecting polyphase alternating current motors, in combination an inverted U-shaped magnetic core, a winding on one leg thereof, an armature beneath the legs of said core and adapted to bridge the gap in said core, integral ears on one end of said armature pivoted directly to one end of said core, a pivoted insulating strip fitted over the other leg of said core and spaced contacts mounted in said strip in the path of said armature and adapted to be bridged thereby when said winding is energized.

In testimony whereof we affix our signatures.

ETHAN A. RICHMOND.
EARL A. DIX.